United States Patent
Bahena et al.

(10) Patent No.: US 11,198,514 B2
(45) Date of Patent: Dec. 14, 2021

(54) ASPIRATOR WITH PRESSURE RELIEF FLAPS

(71) Applicant: GOODRICH CORPORATION, Charlotte, NC (US)

(72) Inventors: Daniel Bahena, Phoenix, AZ (US); Jonathan Ray, Gilbert, AZ (US)

(73) Assignee: Goodrich Corporation, Charlotte, NC (US)

( * ) Notice: Subject to any disclaimer, the term of this patent is extended or adjusted under 35 U.S.C. 154(b) by 248 days.

(21) Appl. No.: 16/544,270

(22) Filed: Aug. 19, 2019

(65) Prior Publication Data
US 2021/0053692 A1    Feb. 25, 2021

(51) Int. Cl.
*B64D 25/14* (2006.01)
*F04F 5/46* (2006.01)

(52) U.S. Cl.
CPC .............. *B64D 25/14* (2013.01); *F04F 5/463* (2013.01)

(58) Field of Classification Search
CPC ..... B64D 25/14; F04F 5/14; F04F 5/18; F04F 5/463; F04F 5/466
See application file for complete search history.

(56) References Cited

U.S. PATENT DOCUMENTS

| | | | | |
|---|---|---|---|---|
| 2,839,073 A * | 6/1958 | Marsh | ................. | F16K 15/202 137/232 |
| 3,056,540 A * | 10/1962 | Oliver | ................. | B63C 9/24 417/185 |
| 3,460,746 A * | 8/1969 | Forsythe | ................. | F04F 5/461 417/174 |
| 3,468,472 A * | 9/1969 | Hahn | ................. | F04F 5/461 417/191 |
| 3,515,502 A * | 6/1970 | Coordes | ................. | F16K 15/20 417/178 |
| 3,640,645 A * | 2/1972 | Forsythe | ................. | F04F 5/466 417/174 |
| 3,771,913 A * | 11/1973 | MacPherson | ................. | F04F 5/48 417/179 |
| 4,368,009 A * | 1/1983 | Heimovics, Jr. | ................. | B61B 12/005 417/179 |
| 5,002,465 A * | 3/1991 | Lagen | ................. | F04F 5/466 417/181 |
| 5,117,518 A * | 6/1992 | Schild | ................. | A61G 7/05776 5/713 |
| 6,004,176 A * | 12/1999 | Moran | ................. | B64D 25/14 417/191 |
| 6,071,084 A * | 6/2000 | Wass | ................. | F04F 5/463 137/888 |
| 6,240,951 B1 * | 6/2001 | Yori | ................. | F16K 15/207 137/224 |
| 8,066,493 B2 * | 11/2011 | Renz | ................. | F04F 5/54 417/191 |
| 10,167,087 B2 * | 1/2019 | Volny | ................. | F04F 5/18 |

(Continued)

*Primary Examiner* — Hai Phan
*Assistant Examiner* — Son M Tang
(74) *Attorney, Agent, or Firm* — Snell & Wilmer L.L.P.

(57) ABSTRACT

An aspirator for an inflatable assembly may comprise a housing and an inlet flap biased away from an interior of the housing. A pressure relief flap may be biased toward the interior of the housing. A manifold may be located in the interior of the housing and configured to output a primary gas flow toward an outlet of the housing. A nozzle may be fluidly coupled to the manifold. The nozzle may be configured to output the primary gas flow to the manifold.

20 Claims, 7 Drawing Sheets

(56) References Cited

U.S. PATENT DOCUMENTS

| | | | | |
|---|---|---|---|---|
| 10,260,530 | B2* | 4/2019 | Gass | F04F 5/466 |
| 10,384,789 | B2* | 8/2019 | Ruegsegger | B63C 9/24 |
| 2004/0009107 | A1* | 1/2004 | Baker | B64D 25/14 |
| | | | | 422/242 |
| 2006/0244247 | A1* | 11/2006 | Debler | B60R 21/276 |
| | | | | 280/739 |
| 2007/0145729 | A1* | 6/2007 | Ishiguro | B60R 21/239 |
| | | | | 280/739 |
| 2010/0126340 | A1* | 5/2010 | Peterson | A61L 9/14 |
| | | | | 95/32 |
| 2010/0266424 | A1* | 10/2010 | Renz | F04F 5/466 |
| | | | | 417/191 |
| 2017/0297726 | A1* | 10/2017 | Volny | F04F 5/14 |
| 2020/0124192 | A1* | 4/2020 | John | F16K 17/04 |

* cited by examiner

ASPIRATOR WITH PRESSURE RELIEF FLAPS

FIELD

The present disclosure relates to aspirators and, in particular, to an aspirator including a pressure release flap.

BACKGROUND

An emergency evacuation assembly may be used to exit an aircraft absent a jet way or other suitable means of egress for passengers. The evacuation assembly may include an inflatable slide. Current inflatable slides may include one or more pressure relief valves, configured to vent excess gas from the slide should the slide inflate to an overpressure condition. Pressure relief valves increase an overall weight of the slide. Pressure relief valves also tend to add volume, which results in an increased evacuation slide envelope.

SUMMARY

An aspirator for an inflatable assembly is disclosed herein. In accordance with various embodiments, the aspirator may comprise a housing and an inlet flap biased away from an interior of the housing. A pressure relief flap may be biased toward the interior of the housing. A manifold may be located in the interior of the housing and configured to output a primary gas flow toward an outlet of the housing. A nozzle may be fluidly coupled to the manifold. The nozzle may be configured to output the primary gas flow to the manifold.

In various embodiments, the inlet flap may be configured to pivot relative to the housing. The pressure relief flap may be configured to pivot relative to the inlet flap. In various embodiments, the inlet flap may be configured to translate from an open inlet position to a closed inlet position in response to a pressure within the interior of the housing exceeding a predetermined closing pressure. The pressure relief flap may be configured to translate to an open vent position in response to the pressure within the interior of the housing exceeding a predetermined pressure limit.

In various embodiments, the pressure relief flap may be pivotably coupled to the inlet flap via a pivot joint. In various embodiments, the pivot joint may include a torsion spring configured to bias the pressure relief flap toward the inlet flap.

In various embodiments, a seal may be located between the pressure relief flap and the inlet flap. In various embodiments, the seal may comprise a compressible material.

An evacuation assembly is also disclosed herein. In accordance with various embodiments, the evacuation assembly may comprise an inflatable slide and an aspirator fluidly coupled to the inflatable slide. The aspirator may comprise a housing and an inlet flap biased away from an interior of the housing. A pressure relief flap may be biased toward the interior of the housing. A manifold may be located in the interior of the housing and configured to output a primary gas flow toward an outlet of the housing. A nozzle may be fluidly coupled to the manifold. The nozzle may be configured to output the primary gas flow to the manifold.

In various embodiments, a compressed fluid source may be fluidly coupled to the aspirator. In various embodiments, the pressure relief flap may be pivotably coupled to the inlet flap via a pivot joint. In various embodiments, the pivot joint may comprise a torsion spring.

In various embodiments, the aspirator may further comprise a seal configured to form a sealing interface with the pressure relief flap. In various embodiments, the seal may be located between the inlet flap and the pressure relief flap. In various embodiments, the seal may comprise a compressible material.

In various embodiments, the inlet flap may be configured to translate from an open inlet position to a closed inlet position in response to a pressure within an interior volume of the inflatable slide exceeding a predetermined closing pressure, and the pressure relief flap may be configured to translate to an open vent position in response to the pressure within the interior volume of the inflatable slide exceeding a predetermined pressure limit.

A method of making an aspirator is also disclosed herein. In accordance with various embodiments, the method may comprise the steps of pivotably coupling an inlet flap to a housing, biasing the inlet flap away from an interior of housing, pivotably coupling a pressure relief flap to the inlet flap, and biasing the pressure relief flap towards the interior of the housing.

In various embodiments, the method may further comprise configuring the inlet flap to translate from an open inlet position to a closed inlet position in response to a pressure within the interior of the housing exceeding a predetermined closing pressure.

In various embodiments, the method may further comprise configuring the pressure relief flap to translate to an open vent position in response to the pressure within the interior of the housing exceeding a predetermined pressure limit.

In various embodiments, the method may further comprise locating a seal between the inlet flap and the pressure relief flap. In various embodiments, the seal may comprise a compressible material configured to form a sealing interface with the pressure relief flap in response to a biasing force applied to the pressure relief flap by a torsion spring.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the figures, wherein like numerals denote like elements.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the exemplary embodiments of the disclosure, it should be understood that other embodiments may be realized and that logical changes and adaptations in design and construction may be made in accordance with this disclosure and the teachings herein. Thus, the detailed description herein is presented for purposes of illustration only and not limitation. The steps recited in any of the method or process descriptions may be executed in any order and are not necessarily limited to the order presented.

Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option.

Surface cross hatching lines may be used throughout the figures to denote different parts but not necessarily to denote the same or different materials. Throughout the present disclosure, like reference numbers denote like elements. Accordingly, elements with like element numbering may be shown in the figures, but may not necessarily be repeated herein for the sake of clarity.

Evacuation assemblies of the present disclosure may include an inflatable slide with an aspirator fluidly coupled thereto. In accordance with various embodiments, the aspirator may include one or more pressure release flaps. In response to deployment of the evacuation slide, gas flows from a charged cylinder to the aspirator. The flow of gas opens the aspirator inlet flaps, thereby entraining external air through an aspirator inlet. The aspirator is configured such that the inlet flaps close and seal air inside the slide, in response to an internal slide pressure exceeding a predetermined closing pressure. The aspirator is further configured such that the pressure release flaps open in response to the internal slide pressure exceeding a predetermined pressure limit. In this regard, the aspirator's pressure release flaps allow excess pressure to be relieved or "vented" from the slide, thereby eliminating the need for separate pressure relief valves.

In the context of the present disclosure, the methods, evacuation assemblies, and aspirators disclosed herein may find particular use in connection with inflatable evacuation slides. However, various aspects of the disclosed embodiments may be adapted for performance in a variety of other inflatable assemblies, for example, inflatable raft assemblies. As such, numerous applications of the present disclosure may be realized.

Figure 1:
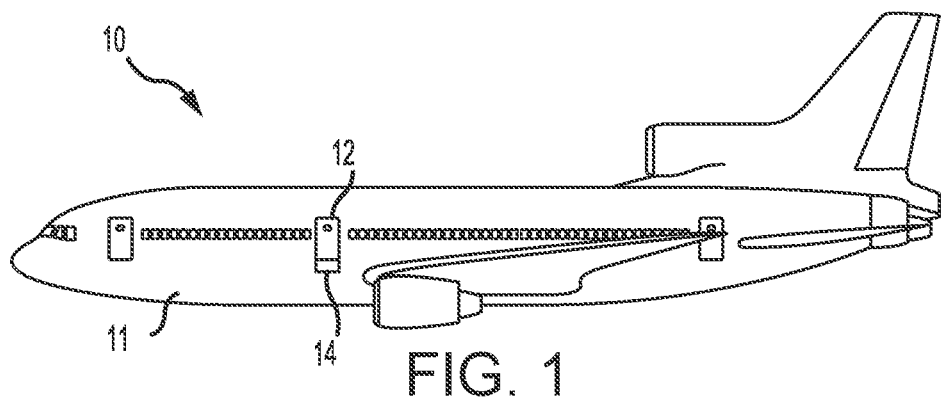
FIG. 1 illustrates an aircraft having an evacuation assembly, in accordance with various embodiments.

Referring now to FIG. 1, an aircraft 10 is shown. Aircraft 10 may include a fuselage 11 having plurality of exit doors, including an exit door 12. Aircraft 10 may include one or more evacuation assemblies positioned near a corresponding exit door. For example, aircraft 10 includes an evacuation assembly 14 positioned near exit door 12. In the event of an emergency, exit door 12 may be opened by a passenger or crew member of aircraft 10. In various embodiments, evacuation assembly 14 may deploy in response to exit door 12 being opened or in response to another action taken by a passenger or crew member such as depression of a button or actuation of a lever.

Figure 2:
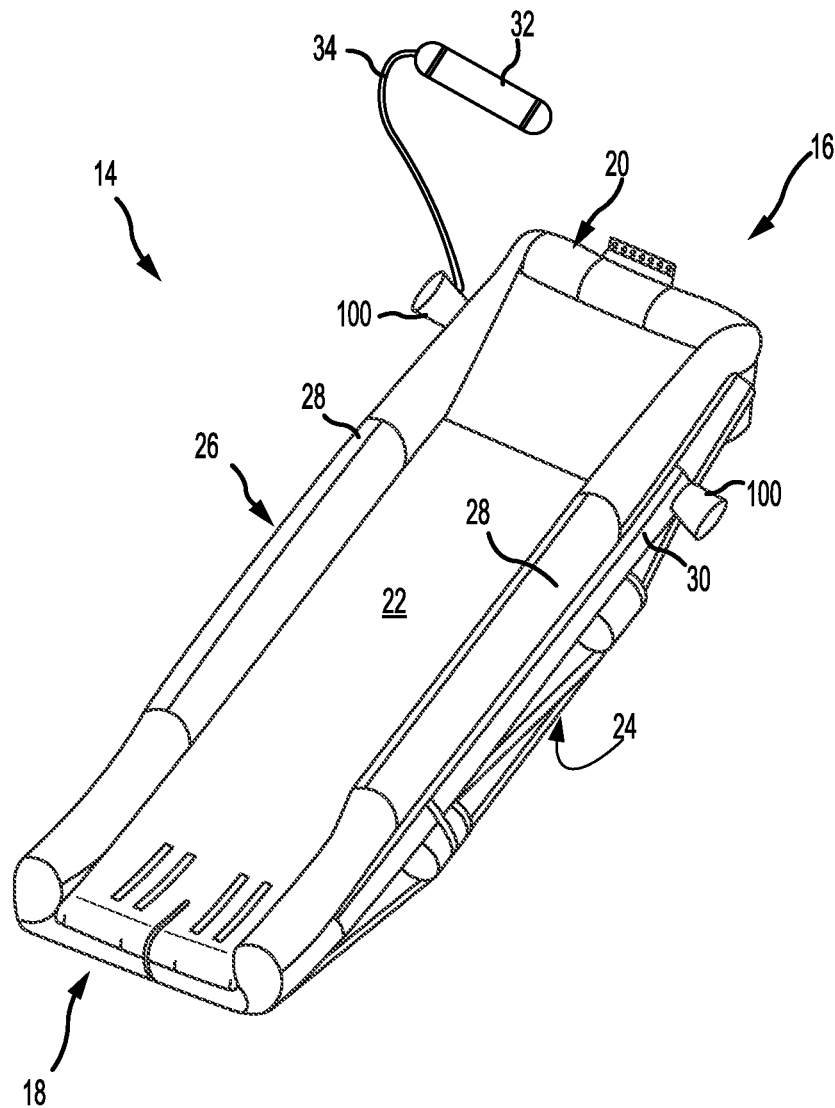
FIG. 2 illustrates a perspective view of an evacuation slide in a deployed position, in accordance with various embodiments.

With reference to FIG. 2, an evacuation slide 16 of evacuation assembly 14 is illustrated with the evacuation slide in an inflated or "deployed" position. In accordance with various embodiments, evacuation slide 16 includes a toe end 18 and a head end 20 opposite toe end 18. Head end 20 may be coupled to an aircraft structure (e.g., fuselage 11 in FIG. 1). In various embodiments, evacuation slide 16 is an inflatable slide. Evacuation slide 16 includes a sliding surface 22 and an underside surface 24 opposite sliding surface 22. Sliding surface 22 extends from head end 20 to toe end 18. During an evacuation event, underside surface 24 may be oriented toward an exit surface (e.g., toward the ground or toward a body of water). Evacuation slide 16 is illustrated as a single lane slide. However, evacuation slide 16 may comprise any number of lanes.

Evacuation slide 16 may comprise a slide rail structure 26. In accordance with various embodiments, slide rail structure 26 is an inflatable structure. Slide rail structure 26 includes a first inflatable tube 28. (also referred to herein as an upper inflatable tube). In various embodiments, slide rail structure 26 may include a second inflatable tube 30 (also referred to herein as a lower inflatable tube). First inflatable tube 28 and second inflatable tube 30 may extend between head end 20 and toe end 18. Upon deployment of evacuation slide 16, first inflatable tube 28 may be located generally over or above second inflatable tube 30 such that first inflatable tube 28 is distal, or located generally farther away from, the exit surface as compared to second inflatable tube 30. Stated differently, upon deployment, second inflatable tube 30 may be located generally between first inflatable tube 28 and the exit surface.

In various embodiments, evacuation assembly 14 may include a compressed fluid source, or charge cylinder, 32. Compressed fluid source 32 is configured to deliver a pressurized gas to inflate evacuation slide 16. Compressed fluid source 32 may be fluidly coupled to evacuation slide 16. For example, compressed fluid source 32 may be fluidly coupled to slide rail structure 26. In various embodiments, compressed fluid source 32 may be fluidly coupled to evacuation slide 16 via a hose, or conduit, 34.

In accordance with various embodiments, evacuation assembly 14 further includes one or more aspirator(s) 100 fluidly coupled between compressed fluid source 32 and evacuation slide 16. In various embodiments, first inflatable tube 28 and second inflatable tube 30 may each have a dedicated aspirator 100, such that a first aspirator is attached, or coupled, to first inflatable tube 28 and a second aspirator is attached, or coupled, to second inflatable tube 30. In various embodiments, compressed fluid source 32 is fluidly coupled to both the aspirator 100 that is coupled to first inflatable tube 28 and to the aspirator 100 that is coupled to second inflatable tube 30. In various embodiments, first inflatable tube 28 and second inflatable tube 30 may each have a dedicated compressed fluid source, such that a first compressed fluid source is fluidly coupled to the aspirator 100 attached to first inflatable tube 28 and a second compressed fluid source fluidly coupled to the aspirator 100 attached to second inflatable tube 30. As discussed in further detail below, aspirator(s) 100 may be configured to entrain ambient air with gas output from compressed fluid source 32 (referred to herein as primary gas). For example, in response to deployment of evacuation slide 16, primary gas from compressed fluid source 32 may flow into aspirator(s) 100. This primary gas flow may cause aspirator(s) 100 to draw in a secondary gas (i.e., ambient air) from the environment. The primary gas flow and the environmental gas may be directed into evacuation slide 16 (e.g., into slide rail structure 26). In response to receiving the primary gas and the environmental gas, evacuation slide 16 begins to inflate.

Figure 3A:
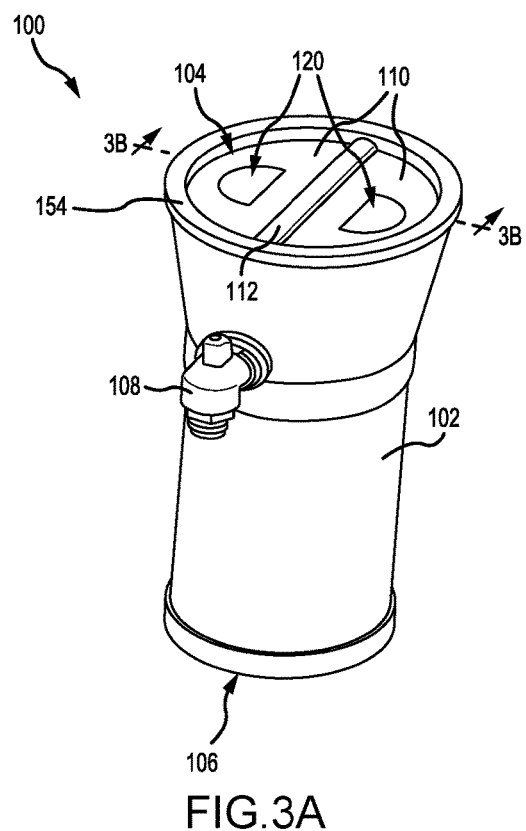
FIGS. 3A and 3B illustrate a perspective view and a cross section view, respectively, of an aspirator with the inlet flaps and the pressure relief flaps in a closed position, in accordance with various embodiments.

With reference to FIG. 3A, a perspective view of an aspirator 100 is illustrated. In accordance with various embodiments, aspirator 100 includes a housing 102. Housing 102 may define an inlet 104 and an outlet 106 of aspirator 100. Aspirator 100 may further include a nozzle 108. Nozzle 108 is configured to fluidly couple to conduit 34 of compressed fluid source 32 (with momentary reference to FIG. 2). In this regard, the primary gas flow from compressed fluid source 32 may be provided to aspirator 100 via nozzle 108.

In accordance with various embodiments, aspirator 100 further includes one or more inlet flaps 110. Inlet flaps 110 are located proximate inlet 104 of aspirator 100. Inlet flaps 110 are configured to pivot relative to housing 102. For example, in various embodiments, inlet flaps 110 may be pivotably coupled to a cross strut 112 of aspirator 100. Cross strut 112 may span a diameter of housing 102. In this regard, cross strut 112 may be coupled to opposing sides of housing 102.

In accordance with various embodiments, aspirator 100 further includes one or more pressure relief flaps 120. In various embodiments, pressure relief flaps 120 are located in inlet flaps 110. In this regard, pressure relief flaps 120 may be coupled to housing 102 via inlet flaps 110. Pressure relief flaps 120 are configured to pivot relative to housing 102 and inlet flaps 110. For example, in various embodiments, pressure relief flaps 120 may be pivotably coupled to inlet flaps 110.

Figure 3B:
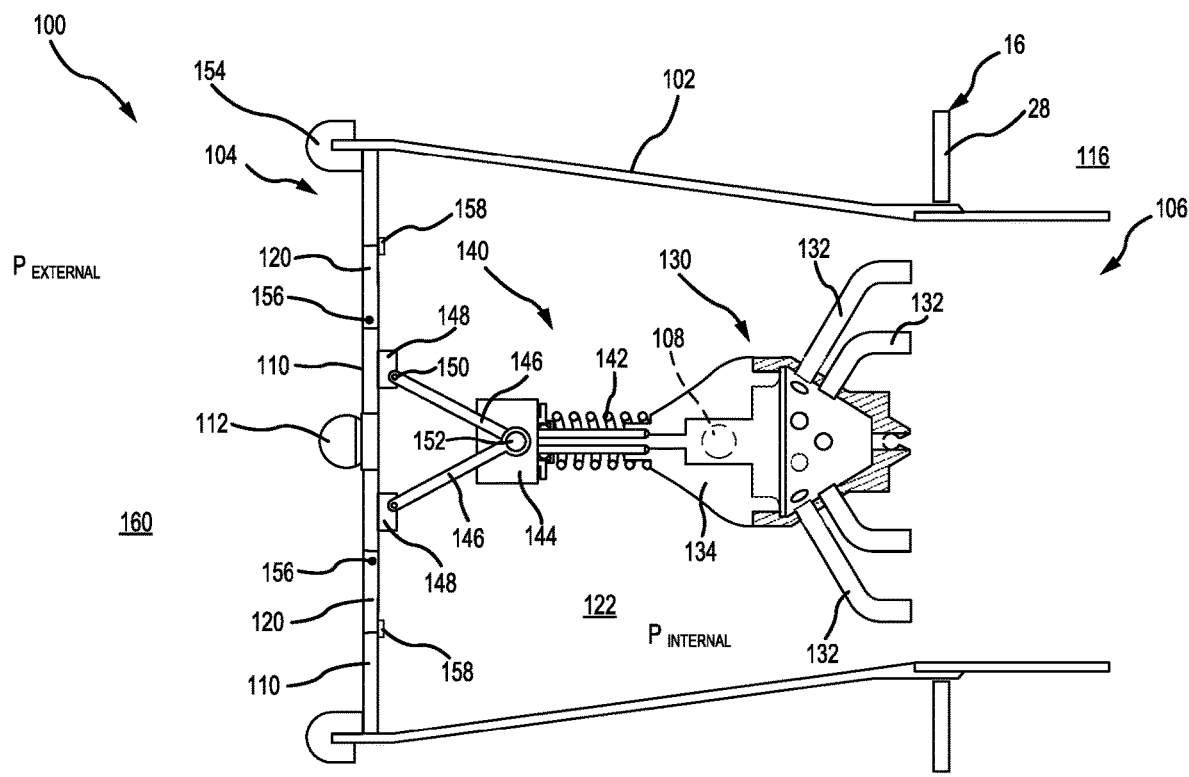

With reference to FIG. 3B, a cross section view of aspirator 100 taken along the line 3B-3B in FIG. 3A is illustrated. In accordance with various embodiments, housing 102 may define an interior volume 122 of aspirator 100. In various embodiments, aspirator 100 may include a manifold 130 located in interior 122. Nozzle 108 is fluidly coupled to manifold 130 and may output the primary gas flow received from compressed fluid source 32 (FIG. 3A) to manifold 130. Manifold 130 may include a plurality of conduits 132 configured to direct the primary gas flow received from compressed fluid source 32 toward outlet 106 of aspirator 100. In various embodiments, conduits 132 may extend from a base 134 of manifold 130. Outlet 106 of aspirator 100 is fluidly coupled to evacuation slide 16. In various embodiments, outlet 106 may be located in an internal volume 116 of evacuation slide. In various embodiments, internal volume 116 may be defined by first inflatable tube 28.

In various embodiments, aspirator 100 may further include an inlet flap support assembly 140 located in interior 122 of aspirator 100. Inlet flap support assembly 140 may be configured to bias inlet flaps 110 towards inlet 104 of housing 102. Stated differently, inlet flaps 110 may be biased away from interior 122 of housing 102. Inlet flap support assembly 140 may include a spring 142. In various embodiments, spring 142 may comprise a coil spring. Spring 142 may be located between base 134 of manifold 130 and a strut support 144 of inlet flap support assembly 140. In accordance with various embodiments, strut support 144 may be configured to translate toward and away from inlet 104 of housing 102. In this regard, manifold 130 may comprise a stationary structure configured to support inlet flap support assembly 140 and the translation of inlet flaps 110. In accordance with various embodiments, one or more flap struts 146 may be coupled between inlet flaps 110 and strut support 144. In various embodiments, flap struts 146 may be coupled to inlet flaps 110 via a coupling 148 attached to inlet flaps 110. Flap struts 146 may be configured to pivot relative to inlet flaps 110 and/or to strut support 144. In this regards, flap struts 146 may be coupled to couplings 148 via pivot joints 150 and to strut support 144 via pivot joint 152.

In FIGS. 3A and 3B, aspirator 100 is illustrated with inlet flaps 110 and pressure relief flaps 120 in a closed position. Aspirator 100 is configured such that when inlet flaps 110 and pressure relief flaps 120 are in the closed position, fluid is blocked, and/or generally prevented, from flowing into and/or out inlet 104 of aspirator 100. In various embodiments, aspirator 100 may include a seal 154 at inlet 104. Seal 154 is configured to form a sealing interface with inlet flaps 110. For example, in various embodiments, seal 154 includes a compressible material configured to contact inlet flaps 110. In this regard, when inlet flaps 110 are in the closed position, spring 142 may force inlet flaps 110 into contact with seal 154, thereby compressing the compressible material of seal 154 and forming a sealing interface between inlet flaps 110 and seal 154. While seal 154 is illustrated as coupled to housing 102, it is further contemplated and understood that seal 154 may be coupled to inlet flaps 110, such that the seal pivots with inlet flap 110.

In accordance with various embodiments, pressure relief flaps 120 may be pivotably coupled to inlet flaps 110 via pivot joints 156. In various embodiments, pivot joints 156 may be configured to bias pressure relief flaps 120 toward interior 122 of aspirator 100. For example, in various embodiments, pivot joint 156 may include a torsion spring configured to bias pressure relief flaps 120 toward the closed position. In various embodiments, a seal 158 may be located between pressure relief flaps 120 and inlet flaps 110. Seal 158 is configured to form a sealing interface with pressure relief flaps 120. In various embodiments, seal 158 may comprise a compressible material. In this regard, pivot joint 156 may force pressure relief flaps 120 into contact with seal 158, thereby compressing the compressible material of seal 158 and forming a sealing interface between pressure relief flaps 120 and seal 158. While seals 158 are illustrated as coupled to inlet flaps 110, it is further contemplated and understood that seal 158 may be coupled to pressure relief flaps 120, such that the seal pivots with pressure relief flaps 120.

Figure 4A:
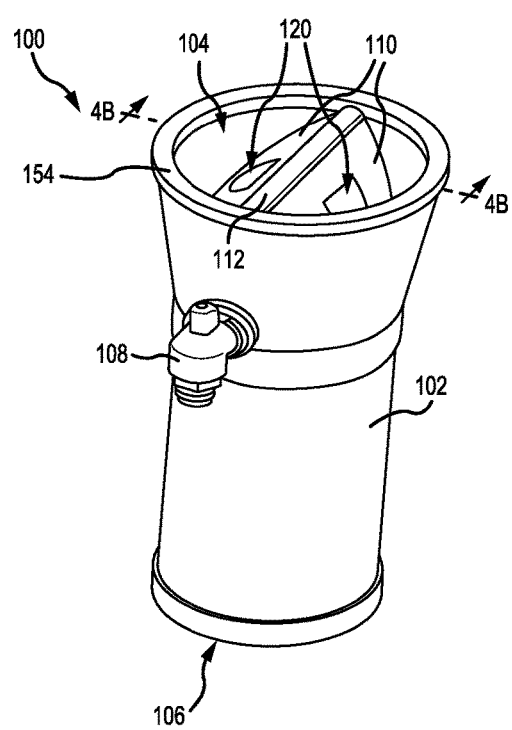
FIGS. 4A and 4B illustrate a perspective view and a cross section view, respectively, of an aspirator with the inlet flaps in an open inlet position and the pressure relief flaps in a closed position, in accordance with various embodiments.
Figure 4B:
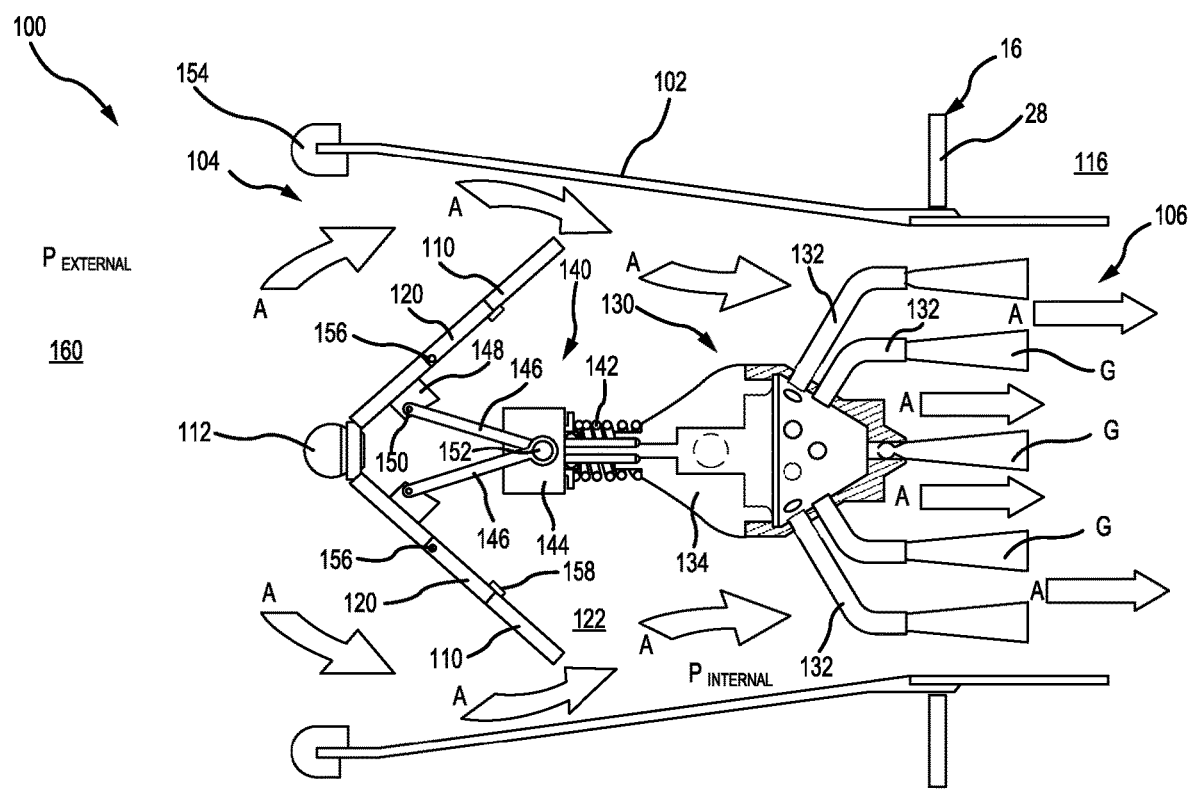

With reference to FIGS. 4A and 4B, a perspective view of aspirator 100 and a cross section view of aspirator 100 taken along the line 4B-4B in FIG. 4A are illustrated, respectively, with inlet flaps 110 in an open inlet position and pressure relief flaps 120 in the closed position. In accordance with various embodiments, during inflation of evacuation slide 16, the force generated by the flow of primary gas G from conduits 132 may exceed the spring force of spring 142, thereby causing inlet flaps 110 to pivot to an open position (referred to herein as an open inlet position). In this regard, the pressure differential created between the pressure in interior 122 ($P_{INTERNAL}$) and the pressure in an area 160 exterior to housing 102 ($P_{EXTERNAL}$) by the flow of primary gas G toward outlet 106 may cause inlet flaps 110 to pivot toward interior 122 and outlet 106. Translation of inlet flaps 110 away from inlet 104 may allow ambient air A to flow through inlet 104 and into interior 122. The ambient air A may mix with primary gas G outlet from manifold 130. The mixture of ambient air A and primary gas G is provided to evacuation slide 16 through outlet 106. In various embodiments, translation of inlet flaps 110 to the open inlet position causes strut support 144 to translate toward outlet 106. Translation of inlet flaps 110 between the open and the closed positions may, in various embodiments, cause flap struts 146 to pivot about pivot joints 150 and/or pivot joint 152.

As the flow velocity of primary gas G decreases (i.e., as compressed fluid source 32 empties) and/or as the internal volume 116 of first inflatable tube 28 fills with fluid, the pressure within in interior 122 ($P_{INTERNAL}$) begins to increase. Spring 142 is configured such that in response to the $P_{INTERNAL}$ exceeding a predetermined closing pressure, the biasing force applied by spring 142 in combination with the increased pressure within interior 122 translates inlet flaps 110 to the closed position (i.e., toward inlet 104 and into contact with seal 154).

Figure 5A:
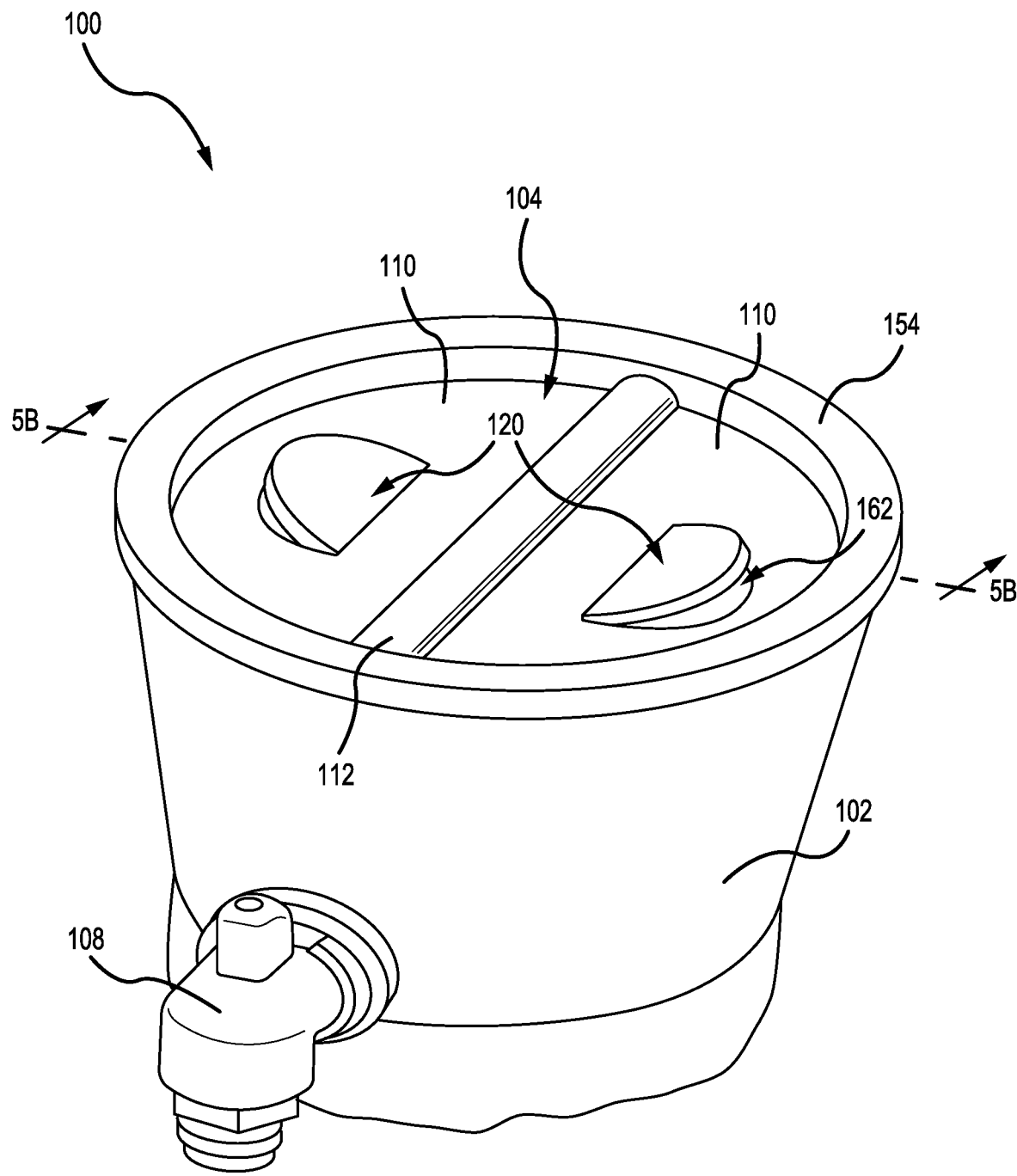
FIGS. 5A and 5B illustrate a perspective view and a cross section view, respectively, of an aspirator with the inlet flaps in a closed inlet position and the pressure relief flaps in an open vent position, in accordance with various embodiments.
Figure 5B:
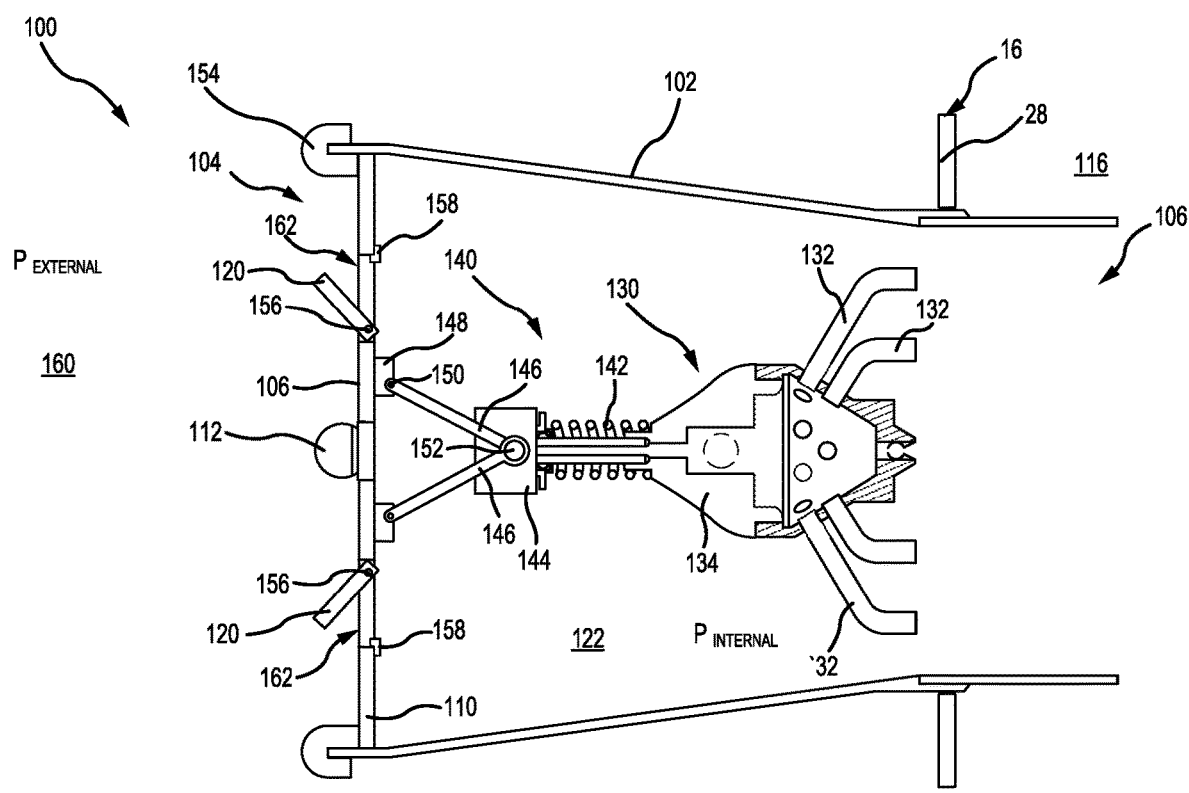

With reference to FIGS. 5A and 5B, a perspective view of aspirator 100 and a cross section view of aspirator 100 taken along the line 5B-5B in FIG. 5A are illustrated, respectively, with inlet flaps 110 in the closed position and pressure relief flaps 120 in an open, or venting, position (referred to herein as an open vent position). In accordance with various embodiments, pressure relief flaps 120 are configured to pivot to an open vent position (i.e., translate away from inlet flaps 110 and interior 122) in response to $P_{INTERNAL}$ exceeding a predetermined pressure limit. In accordance with various embodiments, $P_{INTERNAL}$ correlates to the internal pressure of evacuation slide 16. In this regard, an increase in the pressure of evacuation slide 16 increases $P_{INTERNAL}$. In accordance with various embodiments, aspirator 100 is configured such that when $P_{INTERNAL}$ exceeds the predetermine pressure limit, the biasing force applied by pivot joint 156 to pressure relief flaps 120 is overcome, thereby allowing pressure relief flaps 120 to pivot to the open vent position. Stated differently, pivot joint 156 is configured such that the biasing force applied by pivot joint 156 to pressure relief flaps 120 is equal to the predetermined pressure limit. In this regard, pressure relief flaps 120 will translate to the open vent position in response to $P_{INTERNAL}$ exceeding the predetermined pressure limit. When pressure relief flaps 120 are in the open vent position, fluid from internal volume 116 of evacuation slide 16 may flow out orifices 162 in inlet flaps 110, thereby decreasing the internal pressure of evacuation slide 16. In various embodiments, orifices 162 are defined by inlet flaps 110. While pressure relief flaps 120 are illustrated as located in inlet flaps 110, it is further contemplated that aspirator 100 may include any number of pressure relief flaps 120 at any location. For example, in various embodiments, aspirator 100 may include one or more pressure relief flap(s) pivotably coupled to housing 102 and/or covering an orifice defined by housing 102.

Aspirator 100 including pressure relief flaps 120 allows fluid to be vented from evacuation slide 16. In this regard, aspirator 100 may eliminate or reduce a need for additional pressure relief valves, which tends to reduce a weight and envelope of evacuation slide 16.

Figure 6:
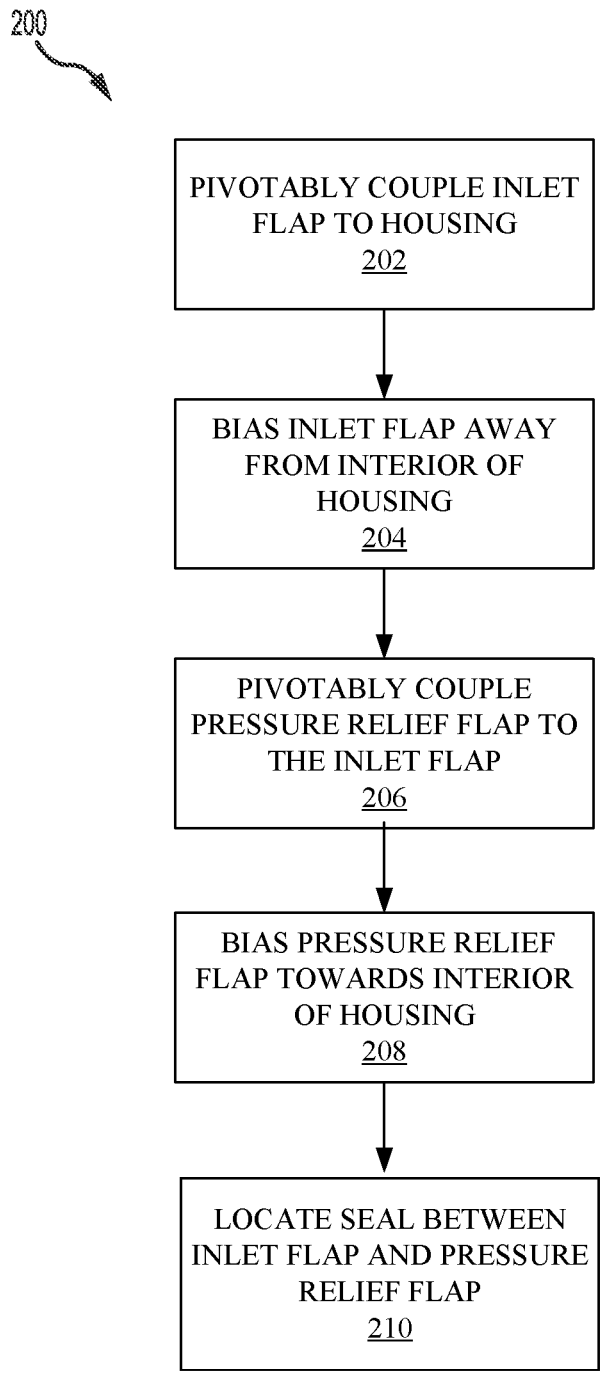
FIG. 6 illustrates a method of making an aspirator including a pressure relief flap, in accordance with various embodiments.

With reference to FIG. 6, a method 200 for forming an aspirator is illustrated. In accordance with various embodiments, method 200 may include pivotably coupling an inlet flap to a housing (step 202), biasing the inlet flap away from an interior of housing (step 204), pivotably coupling a pressure relief flap to the inlet flap (step 206), and biasing the pressure relief flap towards the interior of the housing (step 208).

In various embodiments, step 204 may include configuring the inlet flap to translate from an open inlet position to a closed inlet position in response to a pressure within the interior of the housing exceeding a predetermined closing pressure. In various embodiments, step 208 may include configuring the pressure relief flap to translate to an open vent position in response to the pressure within the interior of the housing exceeding a predetermined pressure limit. In various embodiments, method 200 may further comprise locating a seal between the inlet flap and the pressure relief flap (step 210). In various embodiments, the seal may comprise a compressible material configured to form a sealing interface with the pressure relief flap in response to a biasing force applied to the pressure relief flap by a torsion spring.

With combined reference to FIG. 6 and FIG. 3B, in accordance with various embodiments, step 202 may include pivotably coupling inlet flap 110 to housing 102. Step 204 may include biasing inlet flap 110 away from interior 122 of housing 102. Step 206 may include pivotably coupling pressure relief flap 120 to inlet flap 110. Step 208 may include biasing pressure relief flap 120 towards interior 122 of housing 102. Step 210 may include locating seal 158 between inlet flap 110 and pressure relief flap 120.

Benefits and other advantages have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, and any elements that may cause any benefit or advantage to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is intended to invoke 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. An aspirator for an inflatable device assembly, the aspirator comprising:
   a housing;
   an inlet flap biased away from an interior of the housing;
   a pressure relief flap biased toward the interior of the housing and pivotably coupled to at the inlet flap, wherein the pressure relief flap is configured to be located exterior to the inflatable device, and wherein when the pressure relief flap is in an open vent position fluid may flow from the interior of the housing to an area exterior of the housing;
   a manifold located in the interior of the housing and configured to output a primary gas flow toward an outlet of the housing; and
   a nozzle fluidly coupled to the manifold, wherein the nozzle is configured to output the primary gas flow to the manifold.

2. The aspirator of claim 1, wherein the inlet flap is configured to pivot relative to the housing.

3. The aspirator of claim 2, wherein the inlet flap is configured to translate from an open inlet position to a closed inlet position in response to a pressure within the interior of the housing exceeding a predetermined closing pressure, and wherein the pressure relief flap is configured to translate to the open vent position in response to the pressure within the interior of the housing exceeding a predetermined pressure limit.

4. The aspirator of claim 1, wherein the pressure relief flap is pivotably coupled to the inlet flap via a pivot joint.

5. The aspirator of claim 4, wherein the pivot joint includes a torsion spring configured to bias the pressure relief flap toward the inlet flap.

6. The aspirator claim 1, further comprising a seal located between the pressure relief flap and the inlet flap.

7. The aspirator of claim 6, wherein the seal comprises a compressible material.

8. An evacuation assembly, comprising:
   an inflatable slide; and
   an aspirator fluidly coupled to the inflatable slide, the aspirator comprising:
   a housing;
   an inlet flap biased away from an interior of the housing;
   a pressure relief flap biased toward the interior of the housing and pivotably coupled to the inlet flap, wherein the pressure relief flap is located exterior to the inflatable slide, and
   wherein when the pressure relief flap is in an open vent position fluid may flow from an interior of the inflatable slide to an area exterior of the housing;
   a manifold located in the interior of the housing and configured to output a primary gas flow toward an outlet of the housing; and a nozzle fluidly coupled to the manifold, wherein the nozzle is configured to output the primary gas flow to the manifold.

9. The evacuation assembly of claim 8, further comprising a compressed fluid source fluidly coupled to the aspirator.

10. The evacuation assembly of claim 8, wherein the pressure relief flap is pivotably coupled to the inlet flap via a pivot joint.

11. The evacuation assembly of claim 10, wherein the pivot joint comprises a torsion spring.

12. The evacuation assembly of claim 8, wherein the aspirator further comprises a seal configured to form a sealing interface with the pressure relief flap.

13. The evacuation assembly of claim 12, wherein the seal is located between the inlet flap and the pressure relief flap.

14. The evacuation assembly of claim 13, wherein the seal comprises a compressible material.

15. The evacuation assembly of claim 8, wherein the inlet flap is configured to translate from an open inlet position to a closed inlet position in response to a pressure within an interior volume of the inflatable slide exceeding a predetermined closing pressure, and wherein the pressure relief flap is configured to translate to the open vent position in response to the pressure within the interior volume of the inflatable slide exceeding a predetermined pressure limit.

16. A method of making an aspirator, comprising:
    pivotably coupling an inlet flap to a housing;
    biasing the inlet flap away from an interior of housing;
    pivotably coupling a pressure relief flap to the inlet flap, wherein the pressure relief flap is configured to cover an orifice in the inlet flap, and wherein when the pressure relief flap is in an open vent position fluid may flow through the orifice in the inlet flap and to an area exterior of the housing; and
    biasing the pressure relief flap towards the interior of the housing.

17. The method of claim 16, further comprising configuring the inlet flap to translate from an open inlet position to a closed inlet position in response to a pressure within the interior of the housing exceeding a predetermined closing pressure.

18. The method of claim 17, further comprising configuring the pressure relief flap to translate to the open vent position in response to the pressure within the interior of the housing exceeding a predetermined pressure limit.

19. The method of claim 16, further comprising locating a seal between the inlet flap and the pressure relief flap.

20. The method of claim 19, wherein the seal comprises a compressible material configured to form a sealing interface with the pressure relief flap in response to a biasing force applied to the pressure relief flap by a torsion spring.

* * * * *

UNITED STATES PATENT AND TRADEMARK OFFICE
CERTIFICATE OF CORRECTION

| | | |
|---|---|---|
| PATENT NO. | : 11,198,514 B2 | Page 1 of 1 |
| APPLICATION NO. | : 16/544270 | |
| DATED | : December 14, 2021 | |
| INVENTOR(S) | : Bahena et al. | |

It is certified that error appears in the above-identified patent and that said Letters Patent is hereby corrected as shown below:

In the Claims

Column 9, Line 20, after "pivotably coupled to", please delete the word "at"

Signed and Sealed this
Fifth Day of April, 2022

Drew Hirshfeld
*Performing the Functions and Duties of the*
*Under Secretary of Commerce for Intellectual Property and*
*Director of the United States Patent and Trademark Office*